Figure 1:
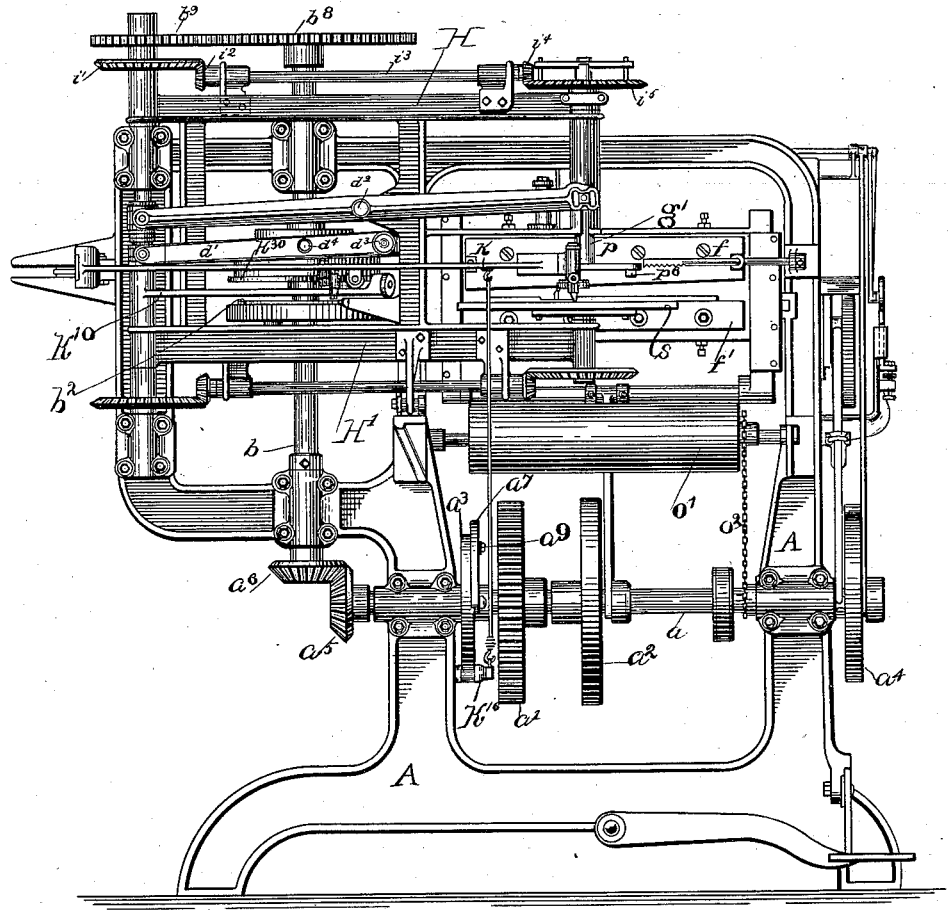

No. 654,837. Patented July 31, 1900.
R. C. MONAHAN.
MACHINE FOR CUTTING ARTICLES OF CURVILINEAR OUTLINE FROM SHEET MATERIAL.
(Application filed Apr. 5, 1900.)

(No Model.) 6 Sheets—Sheet 1.

WITNESSES
H. Henry Marsh.
Sydney E. Taft.

INVENTOR
Richard C. Monahan.
by his Attorney
Reuben L. Roberts.

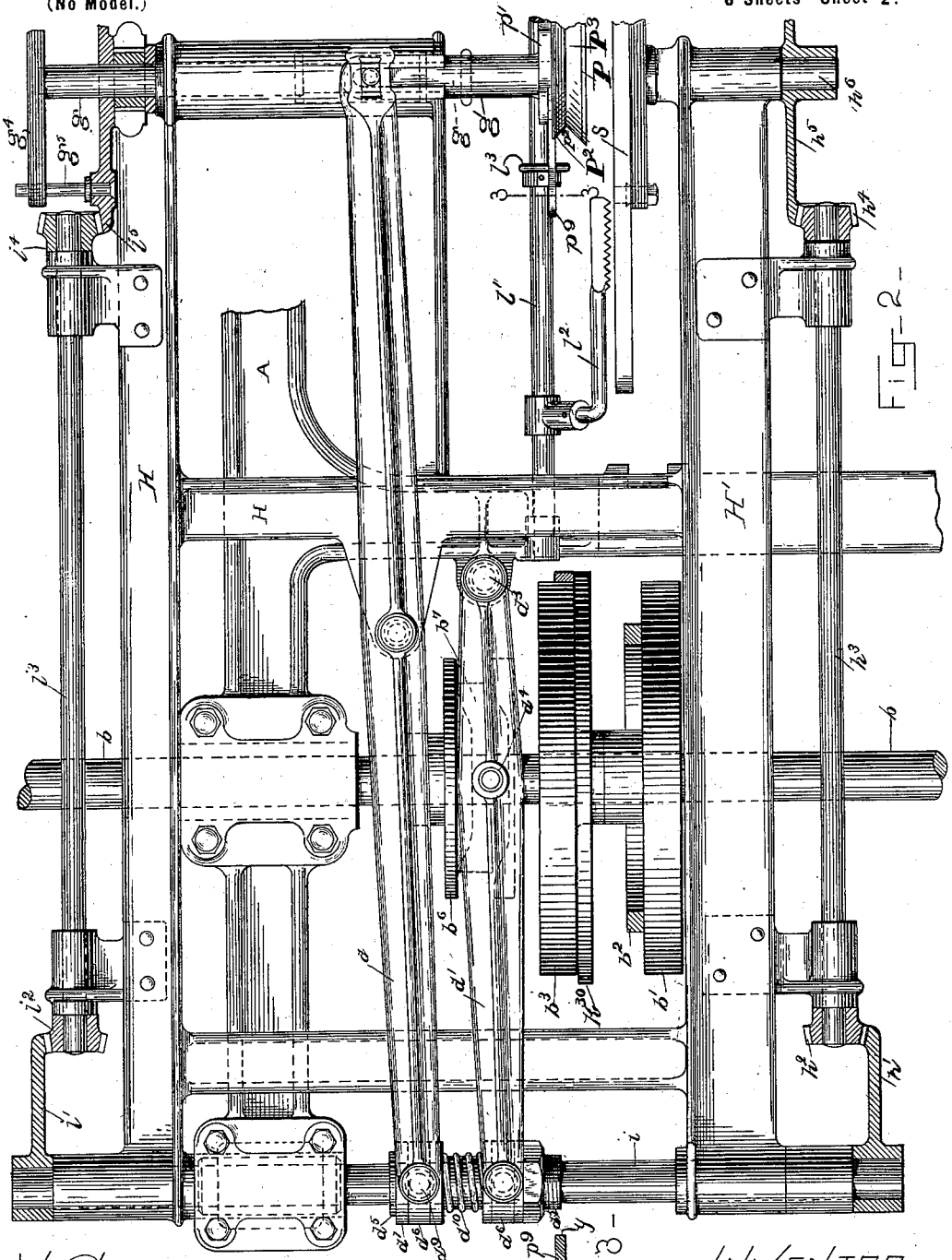

No. 654,837. Patented July 31, 1900.
R. C. MONAHAN.
MACHINE FOR CUTTING ARTICLES OF CURVILINEAR OUTLINE FROM SHEET MATERIAL.
(Application filed Apr. 5, 1900.)
(No Model.) 6 Sheets—Sheet 3.
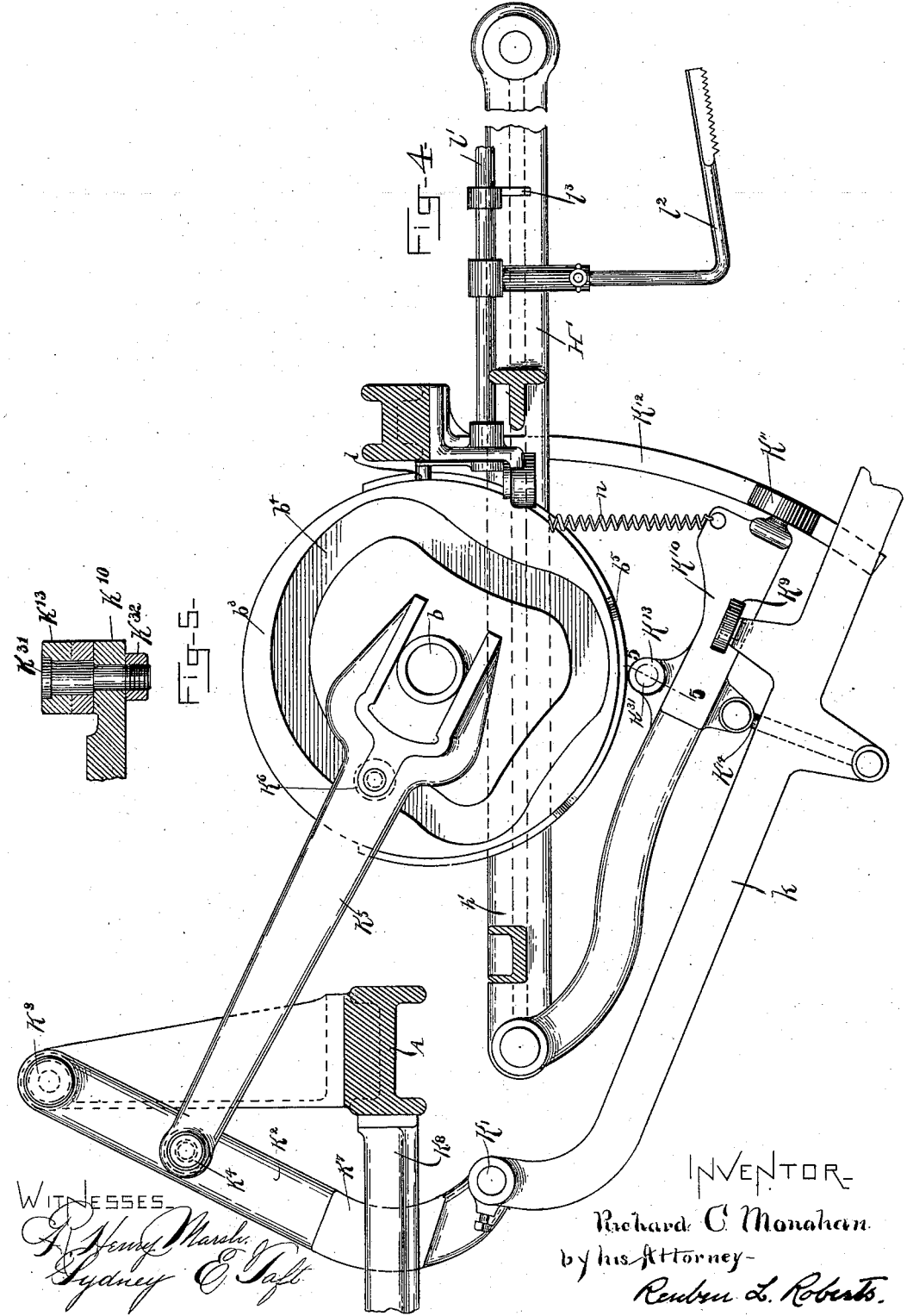
Witnesses
Inventor
Richard C. Monahan
by his Attorney
Reuben L. Roberts No. 654,837. Patented July 31, 1900.
R. C. MONAHAN.
MACHINE FOR CUTTING ARTICLES OF CURVILINEAR OUTLINE FROM SHEET MATERIAL.
(Application filed Apr. 5, 1900.)
(No Model.) 6 Sheets—Sheet 4.
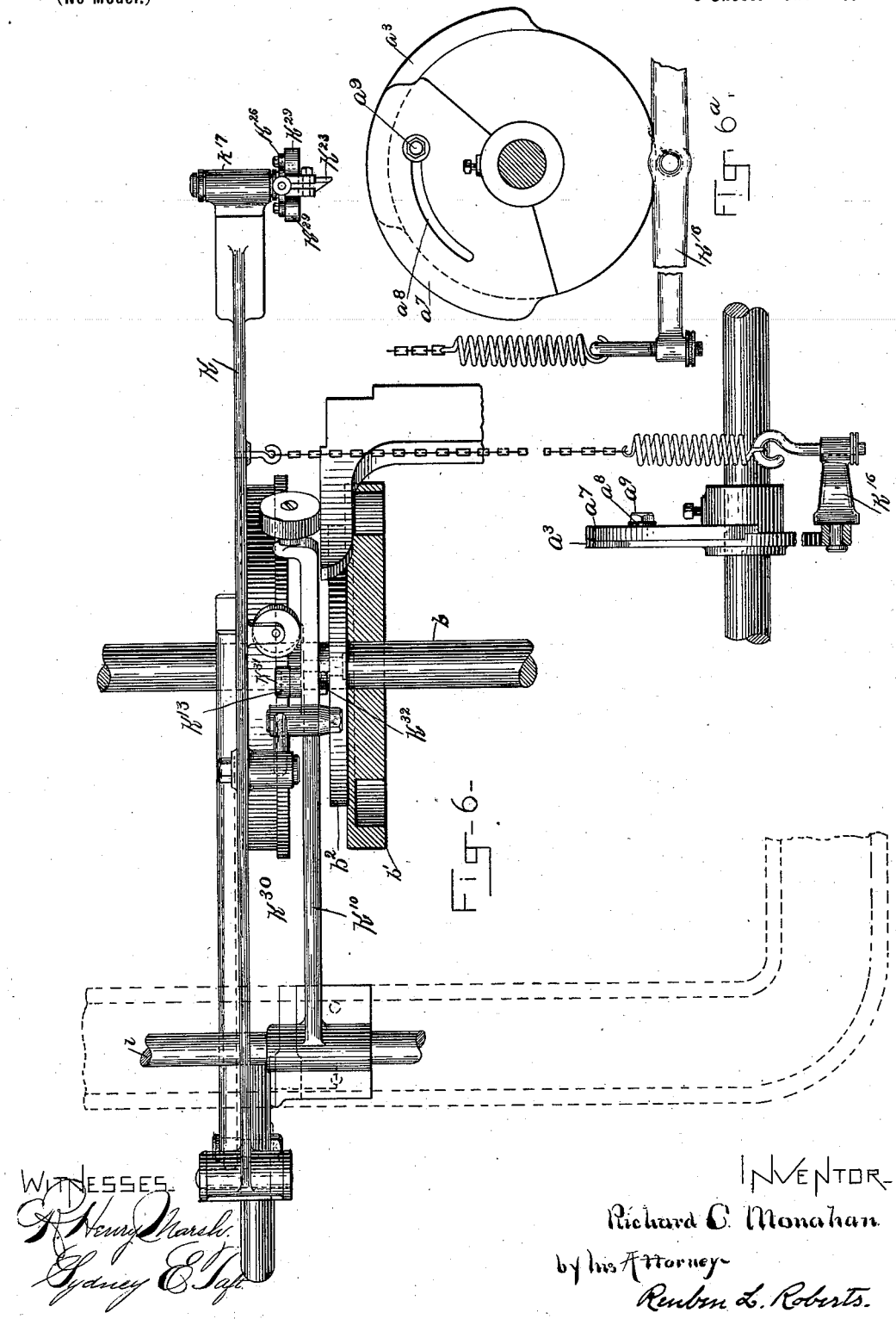
WITNESSES
INVENTOR
Richard C. Monahan
by his Attorney
Reuben L. Roberts.

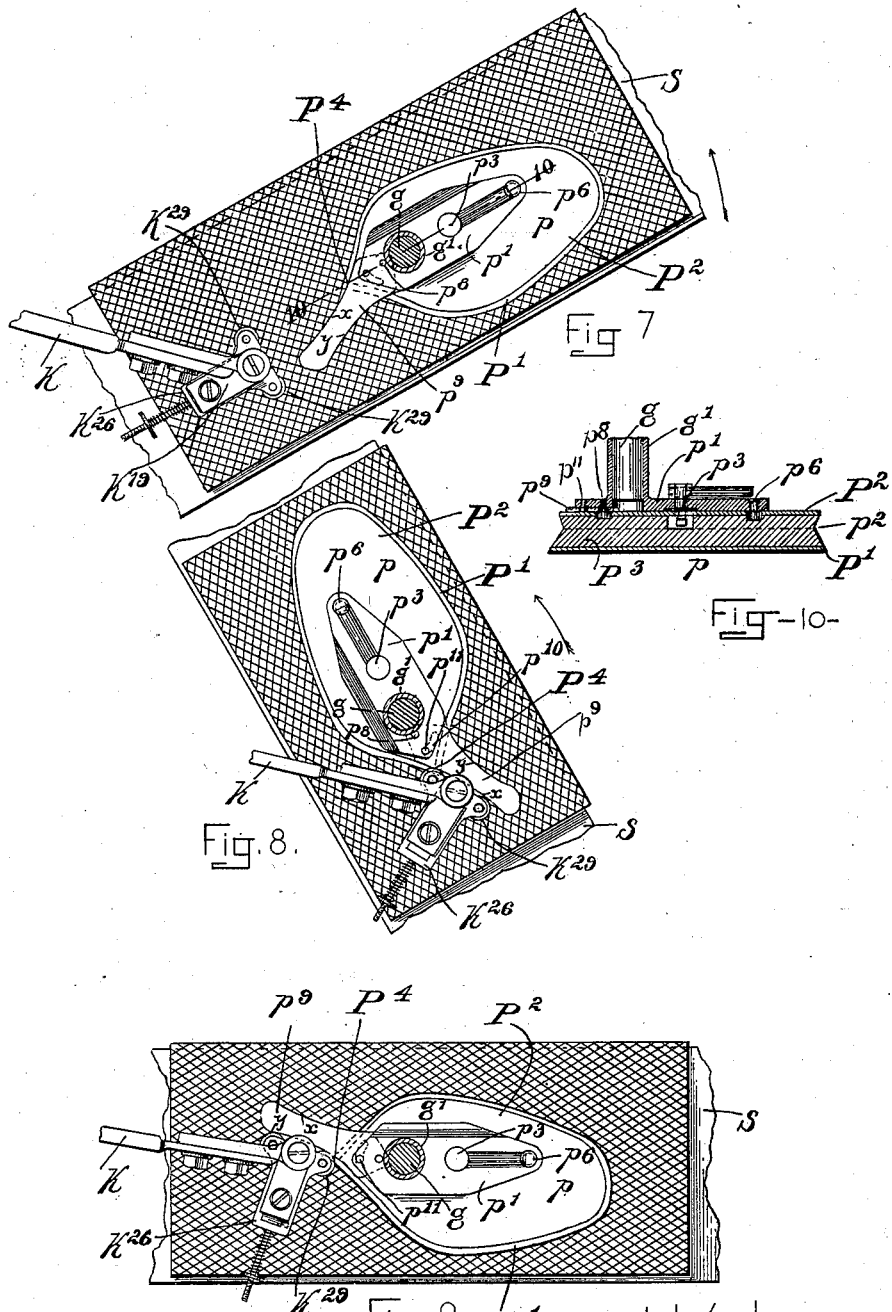

No. 654,837.

R. C. MONAHAN.

Patented July 31, 1900.

MACHINE FOR CUTTING ARTICLES OF CURVILINEAR OUTLINE FROM SHEET MATERIAL.

(Application filed Apr. 5, 1900.)

(No Model.)

6 Sheets—Sheet 6.

WITNESSES=
Henry Marsh
Sydney E. Taft

INVENTOR=
Richard C. Monahan
by his Attorney
Reuben L. Roberts

UNITED STATES PATENT OFFICE.

RICHARD C. MONAHAN, OF EVERETT, MASSACHUSETTS, ASSIGNOR TO ROBERT D. EVANS AND JOHN S. LOCKWOOD, OF BOSTON, MASSACHUSETTS.

MACHINE FOR CUTTING ARTICLES OF CURVILINEAR OUTLINE FROM SHEET MATERIAL.

SPECIFICATION forming part of Letters Patent No. 654,837, dated July 31, 1900.

Application filed April 5, 1900. Serial No. 11,776. (No model.)

*To all whom it may concern:*

Be it known that I, RICHARD C. MONAHAN, a citizen of the United States, residing at Everett, in the county of Middlesex and State of Massachusetts, have invented new and useful Improvements in Machines for Cutting Articles of Curvilinear Outline from Sheet Material, of which the following is a specification.

This invention relates particularly to the clamping-pattern in accordance with which the material is to be cut when used in a machine like that described and shown in United States Letters Patent No. 652,159, dated June 19, 1900, for improvements in machines for cutting boot and shoe soles and other articles of curvilinear outline from sheet material, in which a pattern of the shape of the article desired is employed to clamp the material upon a support and also to guide the knife which cuts the article.

My improvement consists in an adjustable arm or auxiliary guide organized with a guide-plate having a fixed position in relation to the pattern in the machine, and such adjustable device is pivoted in suitable position to guide the trimming-knife beyond the marginal outline of the pattern both at the time when the said knife approaches the pattern at the beginning of its cutting operation and when it leaves the pattern at the end of the cutting operation and in a continuous path which begins and ends at the apex of a salient angle in the peripheral outline of said pattern.

The object of this invention is to produce a machine for cutting articles of curvilinear outline which have a salient angle in their peripheral outline, and for illustration I will describe the improvement in connection with a tap-sole for a boot or shoe cut from sheet material, such as vulcanized india-rubber.

Figure 11:
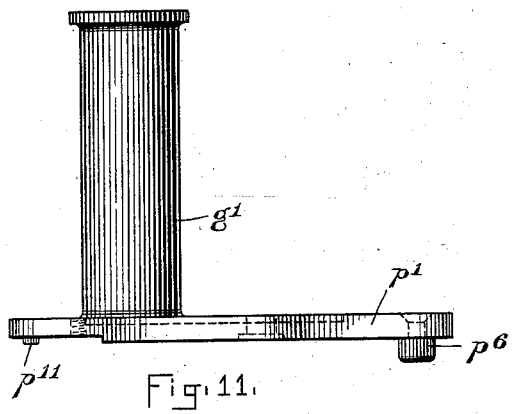
Figure 16:
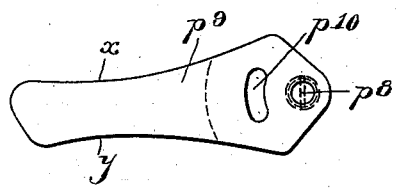
Figure 12:
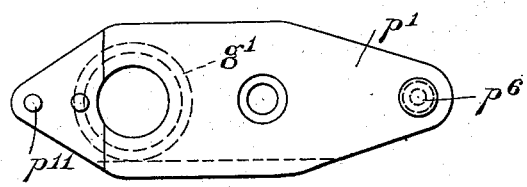
Figure 15:
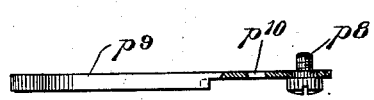
Figure 13:
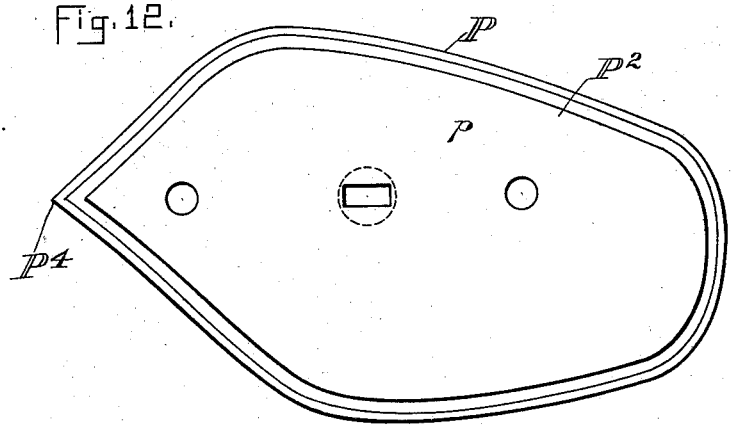
Figure 14:
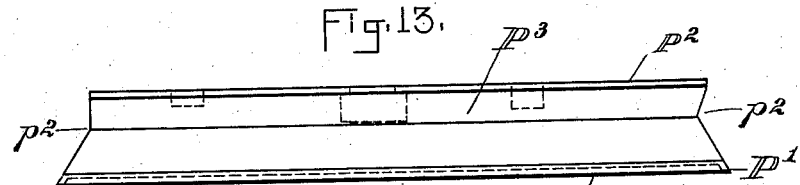

Referring to the drawings, Figure 1 is a front elevation of a machine organized with cams and levers and connecting mechanism suitable for cutting articles of curvilinear outline, to which I have applied my present improvements. Fig. 2 is an enlarged front elevation, partly in section, of the swinging frame for carrying the stock-support and clamping-pattern, together with the mechanism for operating said parts and a portion of the frame of the machine and of the mechanism for stripping the sole and scrap from the stock-support or cutting-table. A portion of the mechanism at the right hand of the figure is broken away to save space in the drawing. Fig. 3 is a detail section, line 3 3, Fig. 2, looking toward the right in said figure. Fig. 4 is an enlarged plan view, partly in section, of the swinging frame for carrying the stock-support and clamping-pattern, the flexible arm which carries the trimming-knife holder, mechanism for operating said flexible arm, and a portion of the mechanism for stripping the sole and scrap from the stock-support. Fig. 5 is a detail section taken on the line 5 5, Fig. 4. Fig. 6 is a front elevation, partly in section, of the trimming-knife and holder, their supporting flexible arm, and the mechanism for pulling down on said flexible arm. A portion of the frame of the machine is shown in dotted lines. Fig. 6$^a$ is a side elevation of the cam for pulling down said flexible arm, shown in Fig. 6 in edge view. Figs. 7, 8, and 9 are plan views illustrating different positions assumed by the clamping-pattern, adjustable auxiliary guide-plate, and trimming-knife holder during the operation of cutting a tap-sole. Fig. 10 is a vertical longitudinal section on line 10 10, Fig. 7. Fig. 11 is an enlarged side elevation of the clamping-pattern holder. Fig. 12 is a plan of said pattern-holder viewed from beneath. Fig. 13 is a plan view, and Fig. 14 a side elevation, of the clamping-pattern and fixed guide-plate. Fig. 15 is a side elevation, partly in section, and Fig. 16 a plan, of the adjustable arm or auxiliary guide-plate and its pivotal stud.

Similar letters refer to same parts of the machine throughout the several views of the drawings.

In the drawings, $p$ is a clamping-pattern having the outline of a tap-sole, and it is made up of three parts rigidly fastened together—viz., a sheet-metal pattern P with beveled edges P' on the under side of said clamping-pattern, a guide-plate P$^2$, and an intermediate block P$^3$, preferably of light tough material, such as wood, and having an angular groove $p^2$ in its edge to accommodate the trimming-knife $k^{23}$ and its holder $k^{19}$. The guide-plate P$^2$ serves as a guide for the antifriction-rolls $k^{29}$ of the trimming-knife holder $k^{19}$. The edge of said guide-plate P$^2$ is parallel to that of the sheet-metal pattern P, and both terminate at one end in a salient angle at the apex $P^4$. The clamping-pattern $p$ is clamped to a holder $p'$ by a cam-pin $p^3$ and is held in line thereon by the pin $p^6$ and shouldered screw $p^8$. The holder $p'$ has formed thereon a sleeve $g'$, which is attached by a pin to a vertical shaft $g$. This shaft is raised and lowered at the proper time through its connection with a lever $d$, which is caused to tilt on its fulcrum by the operation of the lever $d'$, with which it is connected, and which lever $d'$ is moved up and down on its pivot $d^3$ by means of a cam-roll $d^4$, which runs in the cam-groove $b^7$ in the wheel $b^6$, and the said shaft $g$, with the clamping-pattern $p$ and the stock-support $s$, are rotated through the gears $i^5$ $i^4$ $i^2$ $i'$, connected by the shaft $i^3$, and the gears $h^5$ $h^4$ $h^2$ $h'$, connected by the shaft $h^3$. (Shown on Fig. 2.)

Machines of this character heretofore in use have been adapted for cutting from the sheet material articles having no salient angle in their peripheral contour, and the guide-plate $P^2$ upon the pattern has served as a bearing for both of the antifriction-rollers $k^{29}$ during the complete rotation of the pattern; but in cutting an article having a salient angle, as $P^4$, by rotating the pattern while holding the knife against it it is evident that as soon as the knife arrives at the point $P^4$ the rolls $k^{29}$ could not both bear upon the guide-plate $P^2$, and therefore the knife $k^{23}$ would not be properly guided when passing said point. To overcome this difficulty, I provide an adjustable auxiliary guide-plate $p^9$, pivoted upon the shouldered screw $p^8$ to the holder $p'$. This auxiliary guide-plate $p^9$ is slotted at $p^{10}$ to receive a stop-pin $p^{11}$, and the slot is formed in a curve described from $p^8$ as a center. It will be noted that the auxiliary guide-plate $p^9$ lies in the same horizontal plane as the guide-plate $P^2$, and thus forms a continuation of the guiding-surface for the rolls $k^{29}$ when the trimming-knife is approaching or leaving said guide-plate, as hereinafter described. The trimming-knife holder $k^{19}$ is attached to a flexible arm $k$, which is swung toward and from the clamping-pattern by means of the cam-roll $k^{13}$ on the lever $k^{10}$, which cam-roll bears against a cam $k^{30}$, and the relative time at which the trimming-knife $k^{23}$ is allowed to approach the clamping-pattern $p$ is changed, as hereinafter described. The mechanism for pulling the flexible arm $k$ down and thrusting the trimming-knife through the stock at the proper time is illustrated in Figs. 6 and 6ª and consists of a cam $a^3$, which is provided with an adjustable cam-plate $a^7$, which is slotted at $a^8$ and secured to the cam-blank $a^3$ by a nut and screw $a^9$, thus making it possible to vary the length of the cam-surface and by this means vary the time at which and during which the arm $k$ shall be pulled down, as is desired, in the operation of the machine.

The operation of the machine as a whole is as follows: The blank having been severed from the main sheet of material by the shears $ff'$, Fig. 1, and clamped to the stock-support $s$ by the clamping-pattern $p$, the swinging frame H H' is moved away and the stock-support $s$ and pattern $p$ are rotated by the mechanism hereinbefore specified. Instead of allowing the trimming-knife $k^{23}$ to meet the pattern as it leaves the shears $ff'$ at the side of the sole of the shoe near the shank portion thereof and at the time when said pattern is beginning to rotate, as in prior machines, I hold the trimming-knife out by the cam $k^{30}$ until the pattern $p$ and stock-support $s$ have been given about a quarter-rotation, as shown in Figs. 7 and 8, when the cam $k^{30}$ allows the trimming-knife to approach the pattern $p$, as shown in Fig. 7, and as it approaches near the guide-rolls $k^{29}$ strike the auxiliary guide-plate $p^9$ on the side $x$, as shown in Fig. 8. At this time the knife $k^{23}$ is pulled downwardly and thrust through the stock by the action of the cam $a^3$ upon the lever $k^{16}$ and its connecting mechanism. The rolls $k^{29}$ then follow the auxiliary guide-plate $p^9$ as the pattern is given a further rotation until they pass onto the guide-plate $P^2$ at one side of the apex of the angle $P^4$. While the pattern is rotated to the position shown in Fig. 9 the rolls $k^{29}$ follow the guide-plate $P^2$ and guide the trimming-knife in a path parallel to and very close to the edge $P'$ of the clamping-pattern. Finally, the leading one of the guide-rolls $k^{29}$ strikes the auxiliary guide-plate $p^9$ upon the side $y$ and automatically throws said plate around upon its pivot $p^8$ until one end of the slot $p^{10}$ strikes the stop-pin $p^{11}$ and arrests the plate in the position shown in Fig. 9. It will be seen that when the auxiliary guide-plate $p^9$ is thrown into the position shown in Fig. 9 by the advancing guide-rolls the edge $y$ of said auxiliary guide-plate will form a continuation of the edge of the guide-plate $P^2$ and the trimming-knife $k^{23}$ will be guided in a path continuous with the edge of that pattern $p$ and will leave said pattern in a path which intersects the path in which the knife moved as it approached the pattern at the apex $P^4$ of the salient angle thereof. This is accomplished by making the length of the slot $p^{10}$ just sufficient to cause the respective edges of the auxiliary guide-plate $p^9$ to stop directly over the apex $P^4$ when at the extreme limits of the swing of said plate. As soon as the respective parts have arrived at the relative positions shown in Fig. 9 the cam $a^3$ releases the flexible arm $k$, which springs upwardly, carrying the knife out of the stock, and the arm H is then swung inward, carrying the clamping-pattern $p$ and stock-support $s$ back to the shears $ff'$ to receive another blank cut from the material, and the series of motions hereinbefore described are repeated. The completed tap-sole and scrap are removed from the support $s$ during the return movement of the arm H by the clearing-fingers $l^2$, which are moved down into contact with the sole by the action of the cam $b^5$ upon the arm $l$ on the end of shaft $l'$. The auxiliary guide-plate $p^9$ is turned upon its pivot $p^8$ from the position shown in Fig. 9 to that shown in Figs. 7 and 8 by a plate $l^3$, made fast to the rock-shaft $l'$, against which plate the edge $x$ of the auxiliary guide-plate $p^9$ strikes, Fig. 2, when the swinging frame H carries the clamping-pattern $p$ and the support $s$ back to the shears $ff'$.

In order to adapt the machine herein described to cut outsoles as well as taps with very little loss of time in making the necessary changes therein, I provide upon the lever $k^{10}$ a cam-roll $k^{13}$, fastened thereto by a shouldered stud $k^{31}$ and nut $k^{32}$. When it is desired to cut tap-soles, the cam-roll $k^{13}$ and stud $k^{13}$ are fastened by the nut $k^{32}$ to the upper side of the lever $k^{10}$, as shown in Fig. 5, and the cam-roll $k^{13}$ will then run against the face of the cam $k^{30}$, Fig 6. To change the machine so that it will be adapted to cut full outsoles, the clamping-pattern shown in the drawings hereof is changed for one which has the full outline of a shoe-sole. The cam-roll $k^{13}$ and stud $k^{31}$ are reversed, and the said cam-roll is thus brought below the lever $k^{10}$ and will bear against the face of the cam $b^2$, which is formed so as to hold the knife-carrier away from the pattern only during the time that the stock-support is moving to and from the blank-cutting knives. In addition to these changes the cam-plate $a^7$ is adjusted in relation to the cam $a^8$ so that the time during which the cam holds down the trimming-knife will correspond to the time which it occupies in passing around the circumference of the periphery of the pattern of a complete sole. It will thus be seen that with these few changes the same machine can be adapted to cut either outsoles or tap-soles.

I have shown the auxiliary guide-plate $p^9$ pivoted to the holder $p'$, so that one auxiliary guide-plate may be used for different sizes and styles of patterns; but it is evident that said auxiliary guide-plate may be pivoted to the clamping-pattern or to any portion of the machine bearing a fixed relation to said clamping-pattern without departing from the spirit of my invention.

I claim—

1. A pattern according to which sheet material is to be cut, the edge of which pattern terminates at one extremity in a salient angle, and is provided with an automatically-adjustable guide for the trimming-knife, which guide projects beyond the edge of the pattern over said salient angle, and is capable of a swinging movement across said angle through an arc equal to the width of said guide measured at the apex of said angle.

2. A pattern of curved outline according to which sheet material is to be cut, the curves of the edge of which pattern are interrupted by a salient angle, combined with an arm to guide the trimming-knife beyond the edge of the pattern and which is pivoted over said angle and is adapted to swing upon its pivot across said angle a distance sufficient to place the respective edges of the guiding-arm over the apex of the salient angle at the extreme limits of the swinging movement of said arm.

3. In a machine for cutting articles of curvilinear outline from sheet material, a clamping-pattern of the same outline as the article desired, a guide fixed with relation to said clamping-pattern to guide the cutting-knife around its periphery, and an auxiliary guide pivotally adjustable in a limited arc over the edge of the pattern to guide the knife beyond its edge.

In testimony whereof I have hereunto set my hand in presence of two subscribing witnesses.

RICHARD C. MONAHAN.

Witnesses:
 CHARLES S. GOODING,
 SYDNEY E. TAFT.